US012717029B2

(12) United States Patent
Tosato et al.

(10) Patent No.: US 12,717,029 B2
(45) Date of Patent: Aug. 25, 2026

(54) OPTICAL DETECTION OF OBJECTS HAVING IRREGULAR SURFACES

(71) Applicant: Datalogic IP Tech, S.r.l., Bologna (IT)

(72) Inventors: Paolo Tosato, Bologna (IT); Fabio Bagalà, Bologna (IT)

(73) Assignee: Datalogic IP Tech, S.r.l., Bologna (IT)

( * ) Notice: Subject to any disclaimer, the term of this patent is extended or adjusted under 35 U.S.C. 154(b) by 1020 days.

(21) Appl. No.: 17/841,394

(22) Filed: Jun. 15, 2022

(65) Prior Publication Data

US 2023/0408689 A1 Dec. 21, 2023

(51) Int. Cl.
*G01S 17/04* (2020.01)
*G01S 7/48* (2006.01)
*G01S 17/10* (2020.01)

(52) U.S. Cl.
CPC ............ *G01S 17/04* (2020.01); *G01S 7/4808* (2013.01); *G01S 17/10* (2013.01)

(58) Field of Classification Search
CPC ...... G01S 17/04; G01S 7/4808; G01S 7/4802; G01S 17/10; G01S 17/48; G01S 7/497; G01N 21/17; G01N 21/01; G01N 2021/1738
See application file for complete search history.

(56) References Cited

U.S. PATENT DOCUMENTS 4,963,017 A * 10/1990 Schneiter ................ G01S 17/48 356/3.01
2008/0167834 A1* 7/2008 Herz ..................... G06F 1/3231 250/221
2014/0151558 A1* 6/2014 Bortot .................. H05B 47/115 250/338.1
(Continued)

FOREIGN PATENT DOCUMENTS

| | | |
|---|---|---|
| DE | 102013208664 | 6/2014 |
| EP | 2447739 | 5/2012 |

(Continued)

OTHER PUBLICATIONS

EP Search Report mailed Mar. 23, 2024 in EP App. No. 23179519.6, 20 pages.

(Continued)

*Primary Examiner* — Yuqing Xiao
*Assistant Examiner* — Isabelle Lin Boegholm
(74) *Attorney, Agent, or Firm* — Cozen O'Connor

(57) ABSTRACT

An object detector reads distance measurement information and determines any presence of at least a portion of an object within a target area between the object detector and a background surface. The determination of the presence is based on distance measurement information. The distance measurement information is compared against a lower distance threshold and an upper distance threshold, where the lower distance threshold represents a distance between the object detector and the background surface, less a subtracted margin; and the upper distance threshold representing a distance between the object detector and a point beyond a distance of the background surface by an added margin. Satisfaction of either distance threshold is indicative of the presence of at least a portion of the object within the target area.

20 Claims, 14 Drawing Sheets

(56) References Cited

U.S. PATENT DOCUMENTS

2016/0154094 A1* 6/2016 Ishimaru ................. G01S 17/42
356/4.01
2019/0049581 A1 2/2019 Waslowski
2021/0190951 A1* 6/2021 Höller ..................... G01S 17/34
2022/0174928 A1* 6/2022 Spomer ................. A01M 1/026
2022/0291382 A1* 9/2022 Oberpriller ........... G01S 7/4972

FOREIGN PATENT DOCUMENTS

| | | |
|---|---|---|
| EP | 3979030 | 4/2022 |
| KR | 20220031814 | 3/2022 |
| WO | 2012110837 | 8/2012 |
| WO | 2020205108 A1 | 10/2020 |

OTHER PUBLICATIONS

EP Search Report mailed Nov. 15, 2023 in EP App. No. 23179519.6, 15 pages.
Murakami, "Accuracy Assessment of a Laser Triangulation Sensor", Institute of Electrical and Electronics Engineers, IEEE, US, vol. 2, May 10, 1994, pp. 802-805, xp000509625.
https://www.sick.com/cn/en/photoelectric-sensors/photoelectric-sensors/multiline/c/g262711.

* cited by examiner

EXAMPLES OF
DETECTION VERIFICATION DECISION CRITERIA

| | |
|---|---|
| ABC | B |
| AB | C |
| AC | A+BC |
| BC | AB+C |
| A | AC+B |
| | A+B+C |

*FIG. 8A*

EXAMPLES OF
OFF-STATE TESTING CRITERIA

| | | |
|---|---|---|
| ~D~E~F~G | ~D+~E~F~G | ~G+~D~F |
| ~D~E~F | ~E+~D~F~G | ~G+~E~F |
| ~D~E~G | ~F+~D~E~G | ~D~E+~F~G |
| ~D~F~G | ~G+~D~E~F | ~D~F+~E~G |
| ~E~F~G | ~D+~E~F | ~D~G+~E~F |
| ~D~E | ~D+~E~G | ~D~F+~E~G |
| ~D~F | ~D+~F~G | ~D~G+~E~F |
| ~D~G | ~E+~D~F | ~D~G+~E~F |
| ~E~F | ~E+~D~G | ~D+~E |
| ~E~G | ~E+~D~G | ~D+~F |
| ~F~G | ~E+~F~G | ~D+~G |
| ~D | ~F+~D~E | ~E+~F |
| ~E | ~F+~D~G | ~E+~G |
| ~F | ~F+~E~G | ~F+~G |
| ~G | ~G+~D~E | ~G+~D+~E+~F |

*FIG. 8B*

OPTICAL DETECTION OF OBJECTS HAVING IRREGULAR SURFACES

TECHNICAL FIELD

The present disclosure generally relates to automated optical sensing and, more particularly, to detection of shiny objects using a photosensor.

BACKGROUND

Photosensors are widely used in industry to detect objects in proximity of the sensors. There are myriad applications, including in the fields of material handling, robotics, industrial machinery, transportation, safety, and many others. By way of example, one such application involves detection of moving objects along a conveyor belt.

Usually, in such applications, a triangulation-based sensing arrangement, such as a background-suppression (BGS) sensor is used in which light is emitted from a transmitter and is focused or directed towards a region into which object may move. The light reflects off of a surface of the object (and background) and is detected by a photosensor (e.g., position sensitive detector, (PSD), CMOS, CCD, photodiode array , or the like). The location of the light impinging on the sensor may vary with the distance to the object in a predictable manner, thus providing a measure of the object's proximity.

Such measurement arrangements may be well adapted for known objects with uniform or predictable surfaces. In practice, many kinds of objects to be detected have irregular shapes, reflective surfaces, edges, and various other characteristics that can cause problems in performing distance measurements, such as using a triangulation technique. For example, many packaged goods, such as food products, are packaged in bags, pouches, or wrappers, made from plastic films. Such films may have metallized coatings to make them shiny in appearance or to reflect heat for better preservation of the package's contents, and may have irregular and unpredictable shapes with edges, corners, and folds. Other types of films may be transparent as well as shiny, such as cellophane, which passes certain incident light while reflecting other incident light. Such surfaces will tend to reflect the incident light spuriously, in different directions. Moreover, the intensity of the reflection can be unpredictable depending on the relative angle of the facet or surface portion of the package from which the light is reflected, and the optical system of the photosensor. Such measurement conditions give rise to errors in the measurement of the position. Hence, the object may appear closer or farther from the sensor than its actual proximity.

Other challenges have been observed when the color or contrast of the object to be detected is not appreciably different from the conveyor belt. This challenge may be exacerbated when surface of the conveyor belt changes over time, e.g., due to spills, abrasions, dirt accumulation, or other wear and tear, causing parts of the belt to lighten, darken, or take on different reflective characteristics. Thus, the distance-measurement arrangement used in its reflection-intensity mode may have difficulty differentiating the object to be detected from the background surface.

A practical solution is needed to address these, and other, challenges in photosensor-based measurement systems.

SUMMARY

According to some aspects of this disclosure, apparatus of a photosensing object detector includes controller circuitry interfaced with an illumination source and a photosensor of the object detector. The controller circuitry is operative to read distance measurement information as measured by the photosensor, where the distance measurement information is based on a triangulation-based measurement in which light from the illumination source is reflected from a surface at a target area monitored by the photosensor and received at a portion of the photosensor, and where that portion of the photosensor varies based on the distance between the object detector and the surface.

The controller circuitry is further operative to computationally determine any presence of at least a portion of an object within the target area between the object detector and a background surface. Determination of the presence is based on the distance measurement information. The distance measurement information is compared against a lower distance threshold and an upper distance threshold, with the lower distance threshold representing a distance between the object detector and the background surface, less a subtracted margin. The upper distance threshold represents a distance between the object detector and a point beyond a distance of the background surface by an added margin. Satisfaction of the lower distance threshold is indicative of the presence of at least a portion of the object within the target area, and satisfaction of the upper distance threshold is indicative of the presence of at least a portion of the object within the target area.

Another aspect is directed to autonomously operating a photosensing object detector that includes an illumination source and a photosensor. A baseline characterization of a background surface is performed, including: measuring of distance between the object detector and the background surface; measuring reflection intensity of the background surface. Further, a multi-modal detection of any presence of at least a portion of an object within a target area between the object detector and a background surface is performed. The multi-modal detection includes measuring distance between the object detector and any surface within the target area to produce a distance measurement, and determining a first difference between the distance measurement and the distance between the object detector and the background surface as measured in the baseline characterization, where the first difference is indicative of a trigger event for verification of the presence of at least a portion of the object within the target area.

In response to the trigger event, the verification of at least a portion of the object within the target area is performed, including applying off-state testing criteria that includes a measure of a second difference between any surface within the target area and the background surface, the measure of the second difference is in a modality that is different from the distance measurement.

BRIEF DESCRIPTION OF THE DRAWINGS

FIG. 7A is a flow diagram illustrating an example two-stage process for determining whether an object is detected, according to one type of implementation; FIG. 7B is a flow diagram illustrating a multi-modal verification operation for OFF-to-ON transition, according to an example implementation; FIG. 7C is a flow diagram illustrating a simplified embodiment in which the object detection is a single-stage process in place of the processes of FIGS. 7A-7B. FIG. 7D is a flow diagram illustrating an example multi-modal process for transitioning an object detector from an ON state (indicating detection of an object) to an OFF state (indicating no object detected) according to an example embodiment; FIG. 7E is a diagram illustrating a multi-modal testing procedure according to an example implementation.

FIG. 8A shows various simple examples of Boolean logic that may be applied as detection verification decision criteria according to some embodiments.

FIG. 8B shows some examples of Boolean logic that may be applied as off-state testing criteria according to various embodiments.

DETAILED DESCRIPTION

Figure 1:
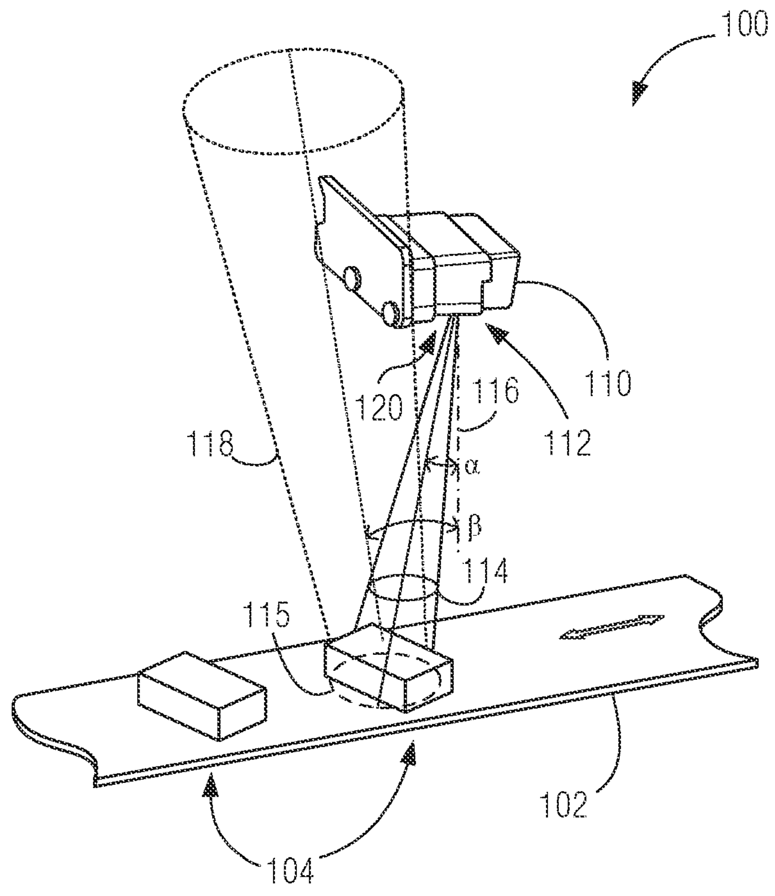
FIG. 1 is a schematic diagram illustrating an object-detection arrangement in a conveyor-belt application utilizing a position-sensitive detector (PSD) according to various embodiments.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

FIG. 1 is a schematic diagram illustrating an object-detection arrangement 100 in a conveyor-belt application utilizing a position-sensitive detector (PSD) according to various embodiments. As depicted, conveyor belt 102 carries objects 104. Object detector 110 is arranged as a diffuse-mode sensor that illuminates a target area and measures light that is reflected from the target area. Accordingly, object detector 110 includes illumination source 112, which may be a LED-based emitter, a laser emitter, or other suitable light source, and optical system to direct transmitted light 114 to target area 115.

As shown, transmitted light 114 is directed at angle $\alpha$ that is offset from perpendicular 116 of the surface of conveyor belt 102. The transmitted light 114 reflects from target area 115, with diffuse-reflected light traveling in many different directions (not shown for clarity of illustration), and specular-reflection 118 being reflected at offset angle $\beta$ from transmitted-light angle $\alpha$. Offset angle $\beta$ depends on transmitted-light angle $\alpha$ and on the orientation of the surface(s) of object 104 from which the specular reflection occurs.

In addition, object detector 110 includes photosensor 120. Photosensor 120 may include one or more photoelectric elements. For example, photosensor 120 may include a PSD, a linear array, or a 2-D array (e.g., dual-PSD, CMOS or CCD image sensor). In operation, the diffuse-reflected light is detected by photosensor 120. Notably, in some embodiments, photosensor 120 is able to discern the presence of an object on the conveyor belt with two distinct modalities: (1) based on a triangulation-measurement configuration, and, (2) based on the intensity (energy) of the diffuse-reflected light.

Figure 2:
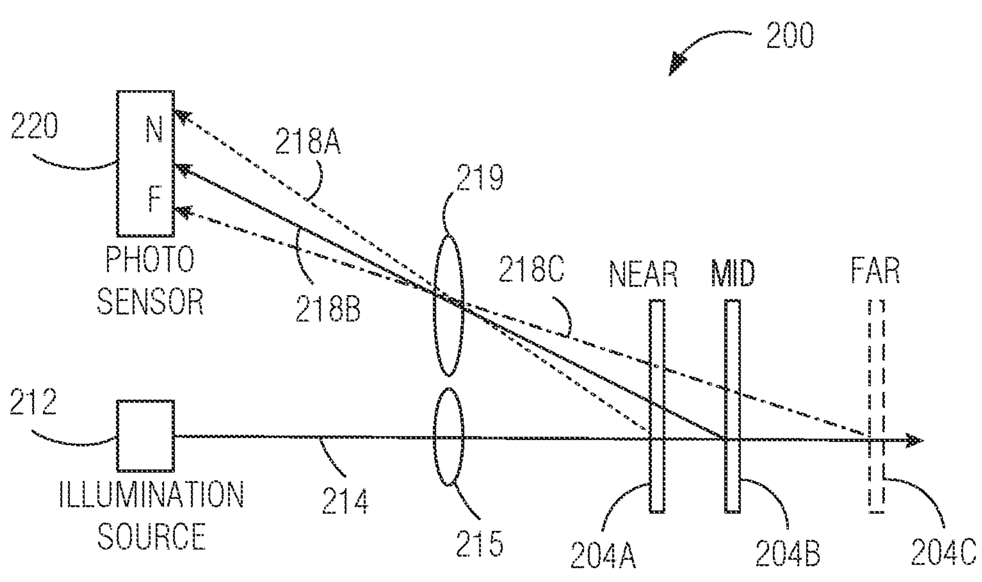
FIG. 2 is a simplified schematic diagram illustrating an example background suppression (BGS) sensor arrangement's optical system according to one example.

FIG. 2 is a simplified schematic diagram illustrating an example BGS sensor arrangement's optical system 200 according to one example. Illumination source 212 (e.g., laser or LED emitter) transmits light beam 214, which is directed through illumination lens 215. Transmitted beam 214 reflects off of an object's surface which may be situated near illumination source 212 at 204A, at an intermediate distance 204B, or at a far distance 204C. Reflected beam 218A, 218B, or 218C, corresponding to the near, intermediate, or far distances 204A, 204B, or 204C, respectively, of the object's surface, is directed through receiving lens 219 and onto photosensor 220. In this example, photosensor 220 is a PSD or sensor array that can discern the position of the reflected beam 218A, 218B, 218C that is focused onto the photosensor. For instance, reflected beam 218A from a surface at near distance 204A impinges at one side of photosensor 220 (as indicated at N); whereas reflected beam 218C from a surface at far distance 204C impinges at another side of photosensor 220 (as indicated at F). The position of light impingement on photosensor 220 is correlated to the distance of the surface 204A, 204B, 204C by a known relationship, such as a hyperbolic function, which is depends on the optical components and their arrangement.

Separately, photosensor 220 is able to discern the intensity of reflected beam 218A, 218B, 218C, which may be measured or assessed in terms of received power, received energy over a monitoring duration, or sensor output amplitude (voltage or current).

Figure 3:
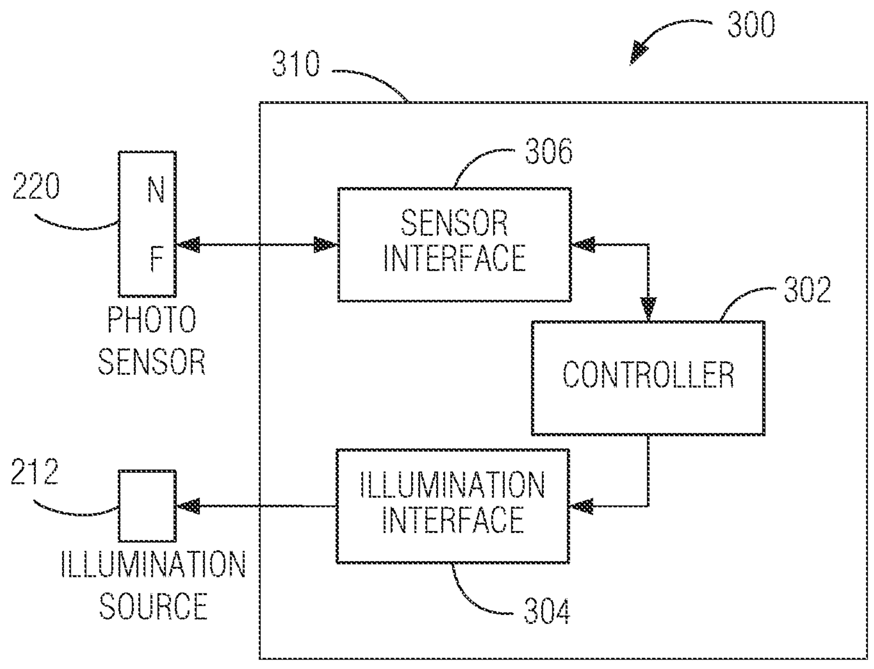
FIG. 3 is a block diagram illustrating sensor circuitry that is incorporated in a BGS sensor according to some embodiments.

FIG. 3 is a block diagram illustrating sensor circuitry 300 that is incorporated in a BGS sensor according to some embodiments. Sensor circuitry 300 may be incorporated in object detector 110 in embodiments where object detector 110 is a BGS sensor. As shown, controller 302 is interfaced with illumination source 212 via illumination interface 304. Also, controller 302 is interfaced with photosensor 220 via sensor interface 306. Controller 302, illumination interface 304, and sensor interface 306 may be housed within the same enclosure 310. In related embodiments, enclosure 310 may contain, or be mechanically coupled to, illumination source 212 and photosensor 220. In other embodiments, controller 302 may be housed in a separate enclosure from photosensor 220, illumination source 212, or both, while still being operatively coupled (e.g., via electrical connection) with those devices.

In some embodiments, controller 302 may include circuitry such as a microcontroller device (e.g., a microprocessor core, memory, non-volatile storage, input/output ports, etc.) that is operative to execute program instructions. In other embodiments, controller 302 includes hardwired or (re)programmable digital logic circuitry (e.g., field-programmable gate array (FPGA), application-specific integrated circuit (ASIC), programmable logic device (PLD), complex PLD (CPLD), programmable array logic (PAL)) that is hardwired, programmed, or re-programmable, to execute logical operations equivalent to the program instructions of microprocessor-based implementations.

Illumination interface 304 may include a driver circuit (e.g., transistor-based amplifier) to supply sufficient power to illumination source 212 and to facilitate switching or other type of modulation of illumination source 212. In some implementations, illumination interface 304 includes a digital-to-analog (D/A) circuit that is suitably interfaced with controller 302 (e.g., via address and data busses, via serial port), and which supplies a variable-voltage signal to the driver circuit such that the intensity of illumination source 212 may be varied under the command of controller 302.

Sensor interface 306 may include suitable interface circuitry for receiving signaling from photosensor 220. Such interface circuitry may include switching circuitry for reading groups, subgroups, or individual photosensor devices (e.g., row/column selection switches), as well as signal-conditioning (e.g., small-signal amplification) circuitry, and analog-to-digital (A/D) circuitry that converts the photosensor output to a digital format readable by controller 302. Sensor interface 306 may include two-way communications to facilitate device/array selection commands from controller 302.

In some implementations, illumination source 212 is modulated (e.g., via on/off keying, frequency-shift keying (FSK), pulse-position modulation (PPM), pulse-width modulation (PWM), pulse amplitude modulation (PAM), or other suitable technique) for encoding a signal to be carried by the light output of illumination source 212. Accordingly, since the reflected light received by photosensor 220 is modulated in a known fashion, a coherent reception technique may be utilized by controller 302 to improve the noise immunity of the system.

Referring briefly to FIG. 1, in general, receiving specular reflection 118 at photosensor 120 is not desirable since it tends to produce an erroneous distance measurement. In the case of the triangulation modality, specular reflections tend to appear at a greater distance than the actual distance of the surface to be measured. In the case of the received-light-intensity modality, specular reflections tend to appear at a smaller distance since they are substantially more energetic than a diffuse reflection. Hence, object-detection arrangement 100 uses the angulation a that is offset from the perpendicular axis for the transmitted light 114, which tends to reduce specular reflections from being directed at photosensor 120, in addition to reducing direct reflections from the background surfaces behind or beneath the object(s) to be detected, as described in greater detail below.

Figure 4:
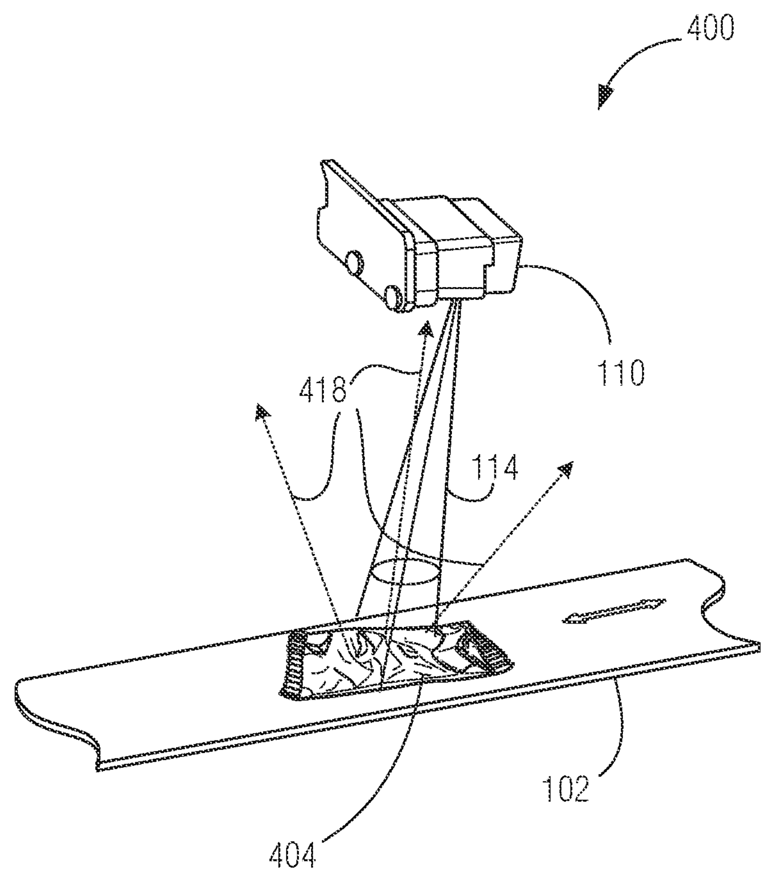
FIG. 4 is a diagram depicting an operational scenario for an object-detection arrangement in which a reflective and multi-faceted object creates spurious specular reflections that may be directed at a photosensor of the measurement arrangement.

In the example illustrated in FIG. 1, objects 104 are shown as simple blocks. However, in the case of reflective and highly-faceted surfaces, such as those of certain pouches made from foil or plastic film and having graphics, metallization, or other coatings that are reflective (e.g., snack-food packaging), there may be substantial specular reflections directed at photosensor 120. FIG. 4 is a diagram depicting such a situation. Conveyor belt 102, object detector 110, and transmitted light 114 are as described above. Object 404 has a shiny and irregular, wrinkled (i.e., faceted) surface that, when illuminated by transmitted light 114, causes specular reflections 418 in many different directions, including some reflections directed back to object detector 110.

Figure 5:
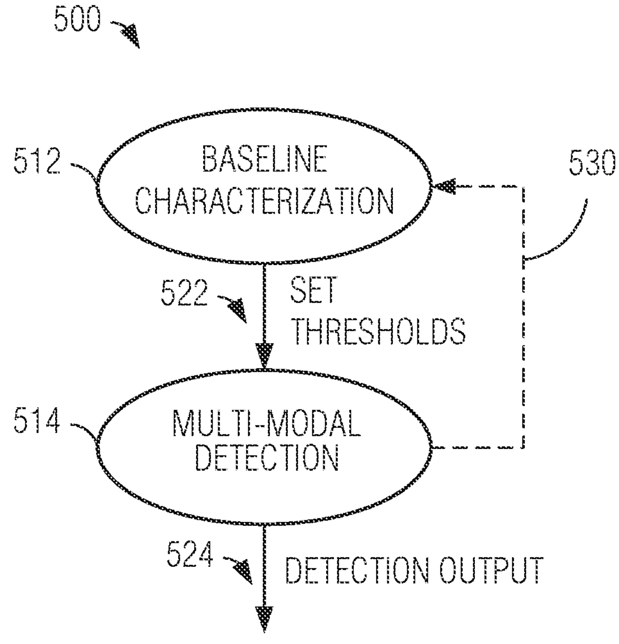
FIG. 5 is a high-level process-flow diagram illustrating a basic operating regime for an object detector according to some embodiments.

FIG. 5 is a high-level process-flow diagram illustrating a basic operating regime 500 for an object detector, such as object detector 110, which overcomes some of the challenges of detecting shiny objects with irregular surfaces, according to some embodiments. Operating regime 500 may be carried out by controller 302, in command of illumination source 212 and photosensor 220 (FIG. 3). At 512, a baseline characterization is performed in the absence of any detectable objects to assess the reflective properties of, and distance to, the background surface which supports the detectable objects or is behind the detectable objects. The background surface may be the top surface of a conveyor belt, a platter, a wall, or other surface. As a result of the baseline characterization, detection thresholds are set, as indicated at 522.

Using the set thresholds, multi-modal detection is performed at 514 to produce a detection output 524 when an object is brought in detectable proximity to the object detector. As described in greater detail below, the multi-modal operation takes into account a plurality of measures to achieve a determination of object detection. Such measures may include, according to various embodiments, a combination of two or more of:

- a triangulation-based distance measure;
- a measure of intensity of diffuse-reflected light;
- a statistical assessment (e.g., dispersion) of a sample set of triangulation-based distance measurements;
- a statistical assessment (e.g., dispersion) of a sample set of intensities of diffuse-reflected light.

In a related embodiment, the multi-modal detection operation 514 is initiated by an initial trigger based on one, or a sample set of, distance measurement(s), with the ensuing multi-modal operation being carried out to assess whether or not an object has been properly detected.

In another related embodiment, operating regime 500 is iterative, with loop 530 permitting the baseline characterization to be performed between detection events, or during a detection determination.

Figure 6:
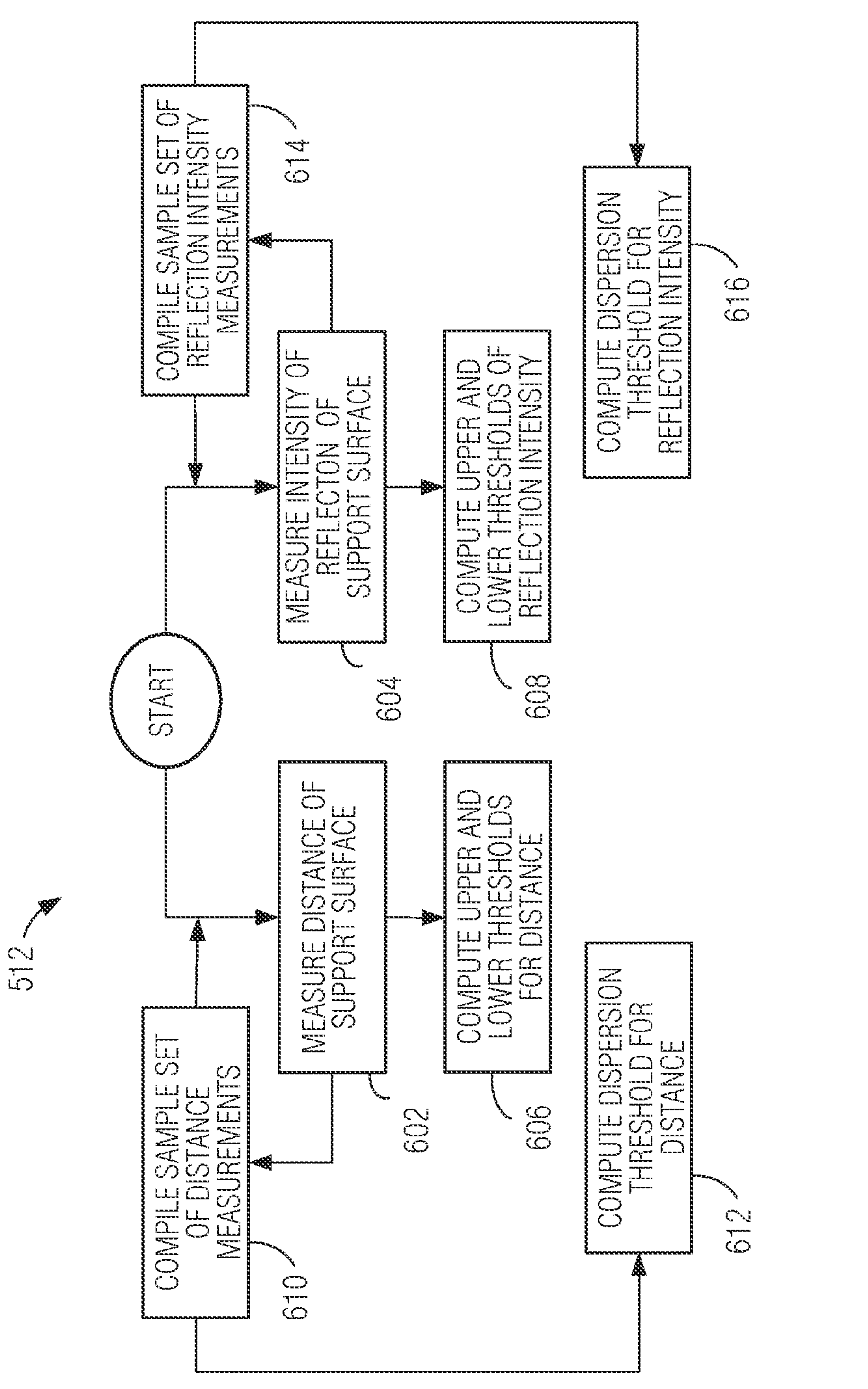
FIG. 6 is a flow diagram illustrating some of the operations of a baseline characterization operation of the operating regime of FIG. 5 according to an illustrative example.

FIG. 6 is a flow diagram illustrating some of the operations of baseline characterization 512 according to an illustrative example. Baseline characterization 512 is carried out during an absence of any detectable objects from the area observable by the object detector. At 602, a triangulation-based distance measurement is made of the background surface. At 604, the intensity of reflected light from the background surface (e.g., power/energy/voltage/current received at photosensor 220) is measured. In cases where the background surface is a moving surface such as a conveyor belt or platter, the background surface may be in motion during the distance and reflection-intensity measurements in order to capture variable surface characteristics of the background surface (e.g., dirt, scuff marks, wear, wet spots, stains, as well as patches, seams, raised edges, or other uneven surface features). Based on the distance and reflection-intensity measurements at 602 and 604, detection thresholds for distance and for reflection intensity are computed at 606 and 608, respectively.

In operation 606, the upper and lower thresholds for the triangulation-based distance measurement are determined based on defined criteria. Each of the upper and lower thresholds for distance may have a hysteresis function associated with it to prevent or reduce oscillation of the detection output when the object to be detected is at or near the distance threshold boundary. The upper and lower distance thresholds may be set based on the particular measurement configuration, meaning that the nominal distance to the background surface as well as the expected dimension of the object to be detected (along the distance-measurement axis) are taken into account.

In addition, the signal-to-noise ratio of the system may be taken into account when setting the upper and lower distance thresholds and the associated hysteresis functions, such that there is sufficient margin between the noise floor and the upper and lower distance thresholds.

In these embodiments, the lower distance threshold may be set to correspond to a distance from the object detector which is between the background surface and an expected surface of the detectable object nearest the object detector. Therefore, the lower distance threshold may be met in an operational scenario where a diffuse reflection from an object is received by the PSD and indicates a distance to the object which is less than the lower distance threshold.

The upper distance threshold represents a distance which is greater than the distance between the object detector and the background surface. The upper distance threshold is not met in an ordinary situation where a diffuse reflection from an object on the background surface, or from the background surface itself, is received at the PSD. Instead, the upper distance threshold is met when a specular reflection from a shiny surface of the object is received at the PSD, which can give the illusion of a greater-than-actual distance to a phantom diffuse object. Accordingly, the upper distance threshold may be set to a distance which is greater than the distance to the background surface by some suitable margin that exceeds the system's noise floor. Although the upper distance threshold may be met by an illusory measurement, it may nonetheless be a reliable indicator of an object detection when used in accordance with embodiments described herein.

In operation 608 another set of thresholds, the upper and lower thresholds of reflection intensity, are computed. Depending on the mode of intensity measurement of the PSD, these thresholds are defined in terms of power, energy, or voltage or current magnitude. Each of the upper and lower reflection-intensity threshold may be associated with a hysteresis function to stabilize the detection output when a received reflection intensity is at or near a threshold boundary. In one example, each reflection-intensity threshold is computed as a percentage of a nominal reflection-intensity value measured from the background surface. For example, the upper reflection-intensity threshold may be defined as the nominal reflection-intensity value plus a margin, e.g., m%, where m is a predefined or application-specific value Likewise, the lower reflection-intensity threshold may be defined as the nominal intensity value minus a margin, e.g., n%, where n is a predefined or application-specific value. The percentages n and m may be equal or unequal depending on the application, and on the system noise profile.

For instance, the signal-to-noise ratio is generally lower for lower reflection intensities; thus, the lower reflection-intensity threshold may be set at a value that exceeds the noise floor by a suitable margin to ensure predictable operation. Since the color and reflectance properties of the background surface may vary from one application to another (e.g., dark-colored conveyor belt vs. light-colored conveyor belt), the values of the upper and lower reflection-intensity thresholds may be set according to each installation's characteristics.

In related embodiments, the relative values of m and n depend on the value of the nominal intensity value such that:

- for relatively higher nominal intensity values (i.e., brighter background surfaces), m is less than n; and
- for relatively lower nominal intensity values (i.e., darker background surfaces), m is greater than n.

Accordingly, the reflection-intensity thresholds provide greater tolerance for dirt, marks, stains, spots, wear, and other imperfections of the background surface with the general understanding that such imperfections of lighter backgrounds tend to appear darker, and imperfections of darker backgrounds tend to appear brighter. In operation, such upper and lower reflection-intensity thresholds help to improve the accuracy of object detection, particularly in situations where the object has a contrasting shade from that of the background surface or where the object has a high reflectivity.

In related embodiments, as further illustrated in FIG. 6, baseline characterization operation 512 includes one or more additional thresholds, namely, a dispersion threshold for distance, a dispersion threshold for reflection intensity, or both. In one such embodiment, as depicted, operation 610 compiles a sample set of distance measurements of the background surface from which a dispersion threshold for distance is computed at 612 Likewise, at 614, a sample set of reflection intensity measurements is compiled, and at 616 a dispersion threshold for reflection intensity is computed.

Dispersion in the present context refers to the extent or characteristic of variability, of a given sample set. Example measures of dispersion include sum of differences, variance, standard deviation, range, interquartile range, mean absolute difference, median absolute deviation, average absolute deviation, distance standard deviation, coefficient of variation, quartile coefficient of dispersion, relative mean difference, variance-to-mean ratio, entropy, or other measure, which may have units or may be dimensionless Likewise, dispersion in the present context includes signal characteristics of the sample set (e.g., waveform, power spectral density).

Each of the dispersion thresholds represents a degree or nature of unevenness of the background surface, whether it is unevenness in surface topography, mechanical vibration, or unevenness in reflectance characteristics (e.g., spots, dirt, scuff or wear marks). These thresholds are particularly applicable in moving-surface applications, as in the case of a conveyor belt, platter, or the like, which tends to exhibit positional and reflectance variability across the moving surface. Ideally, such variability should not affect the object detection result. Accordingly, each dispersion threshold is based on the corresponding nominal dispersion of the background surface, with an added margin to ensure that the corresponding nominal variability of the background surface does not falsely trigger an object detection.

Applications of each of the dispersion thresholds presume that the extent or characteristic of dispersion of measurements corresponding to an object differs by some minimum amount from the nominal dispersion of the background surface. In addition, the dispersion threshold may be configured as an upper threshold or a lower threshold to suit the particular application. For example, in one scenario, it may be presumed that the type of object to be detected has surface characteristics that result in greater distance-measurement dispersion than the background surface. In this scenario, the distance-measurement dispersion threshold is an upper threshold that is set to a greater dispersion value, by a corresponding margin, than the nominal distance-measurement dispersion assessed for the background surface Likewise, it may be presumed that the type of object to be detected has surface characteristics that result in greater reflection-intensity dispersion than the background surface Likewise, the reflections from the background surface are reduced fixing the illumination source and photosensor at positions relative to the background surface such that reflections of the transmitted light from the background surface are directed away from the photosensor. In this scenario, the reflection-intensity dispersion threshold is also an upper threshold that is set to a greater dispersion value, by a corresponding margin, than the nominal reflection-intensity dispersion assessed for the background surface.

In the above examples, the corresponding margin may take into account electrical noise and other noise sources of the system, and each margin may further take into account expected degradation of the background surface or movement mechanism, which would lead to increasing baseline dispersion over time.

In another scenario, the surface features of the type of object to be detected may result in less reflection-intensity dispersion than the background surface. In this example, the reflection-intensity dispersion threshold would be a lower threshold that is set to a lower dispersion value, by a corresponding margin, than the nominal reflection-intensity dispersion assessed for the background surface.

In related embodiments, where signal characteristics of the sample sets of distance measurements or reflection-intensity measurements are taken into account, the corresponding dispersion threshold(s) may be frequency-specific. Accordingly, in scenarios where the background surface has a dispersion pattern with a particular power spectral density, the dispersion threshold may be variously defined for different spectral components. For example, the dispersion threshold may be more sensitive for certain frequency ranges, and less sensitive for other frequency ranges.

Figure 7A:
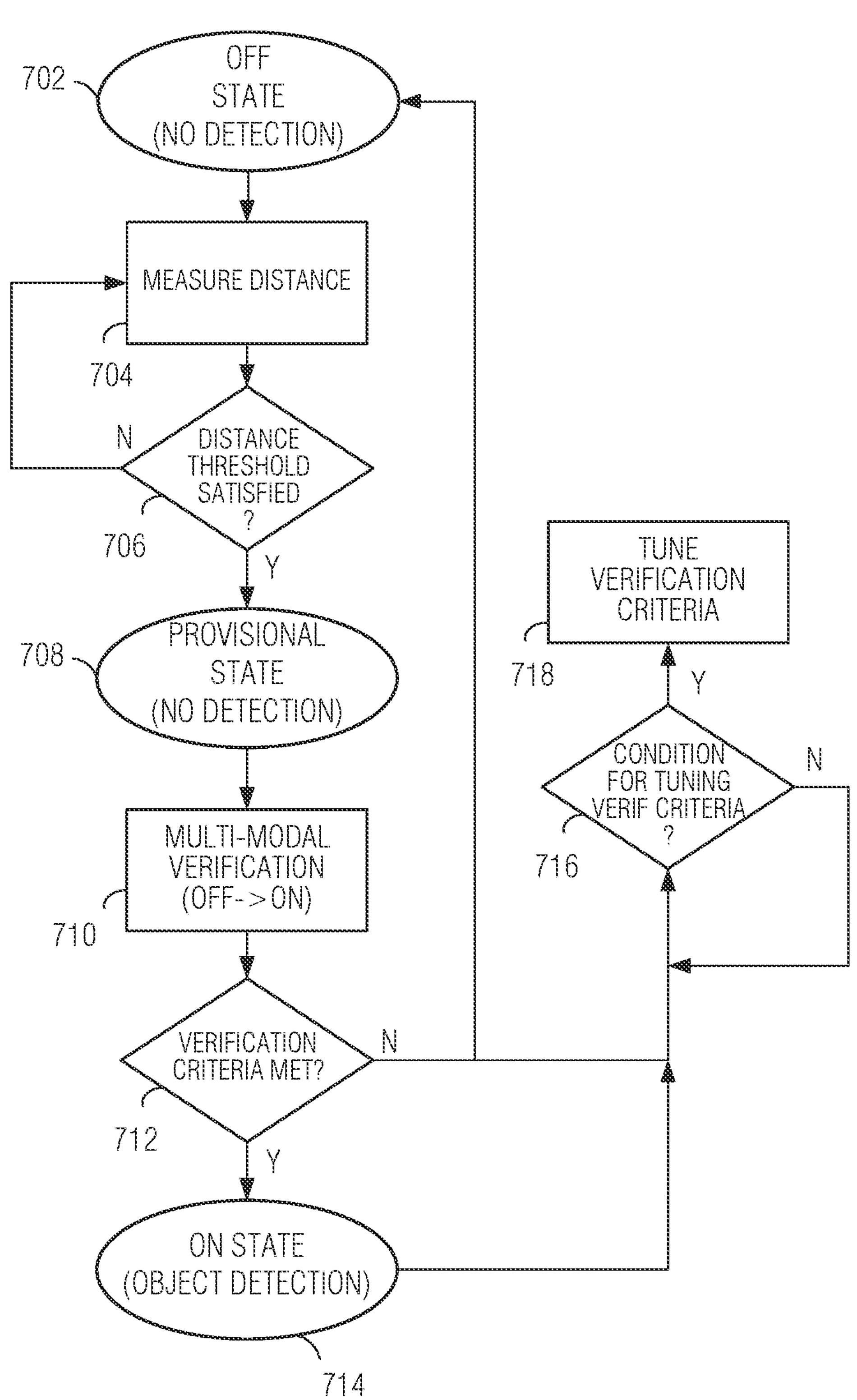
FIGS. 7A-7E are process flow diagrams illustrating examples of the operations of multi-modal detection regime of FIG. 5 according to various embodiments.

FIGS. 7A-7E are process flow diagrams illustrating examples of the operations of multi-modal detection regime 514 of FIG. 5, which may be carried out by object detector 110 according to various embodiments. FIG. 7A is a flow diagram illustrating an example two-stage process for determining whether an object is detected, according to one type of implementation. The two-stage process involves first triggering a preliminary detection using a distance measurement, and then using at least one other detection modality to confirm or reject the preliminary detection.

The process is performed during OFF state 702 as an initial condition, in which no object detection is indicated. At 704, object detector 110 performs a distance measurement using a triangulation technique, such as the technique described above with reference to FIG. 2. At 706, the distance measurement at 704 is compared against the upper and lower distance thresholds, as set at 606 (FIG. 6). Decision 706, determines whether either of the thresholds is met or exceeded which, in this implementation, suggests that an object may be detected, subject to multi-modal verification.

In some embodiments, the distance measurement and comparison against the distance thresholds is performed on a statistical basis. For instance, a predefined number of samples, n, of the distance measurement may be collected and compared against the thresholds. according to various embodiments, n may be 2, 3,4, 5, 6, or more, samples. The number of samples may be one or more orders of magnitude greater (e.g., 10-100, or 100-1000), and limited by the sampling rate, maximum latency, and computing power of controller 302, for example. Decision 706 may require all, or some specified number of samples (e.g., 80% or n or another ratio) satisfy the upper or lower threshold for the threshold-satisfaction to be affirmed. If neither of the distance thresholds is satisfied according to the applicable criteria, process flow loops back to 704 to continue distance measurement.

If a distance threshold is satisfied at 706, the state of detection advances to provisional state 708. Provisional state 708 is not tantamount to a detection, but represents a likelihood that detection of an object may have occurred, subject to verification using at least one other detection mode. Accordingly, multi-modal verification for an OFF-to-ON transition is performed at 710. If the result of the multi-mode verification at 710 is positive, the detection state advances to an ON state at 714 to indicate an object detection. If the multi-modal verification fails to meet the applicable criteria, the process loops to OFF state at 702.

Figure 7B:
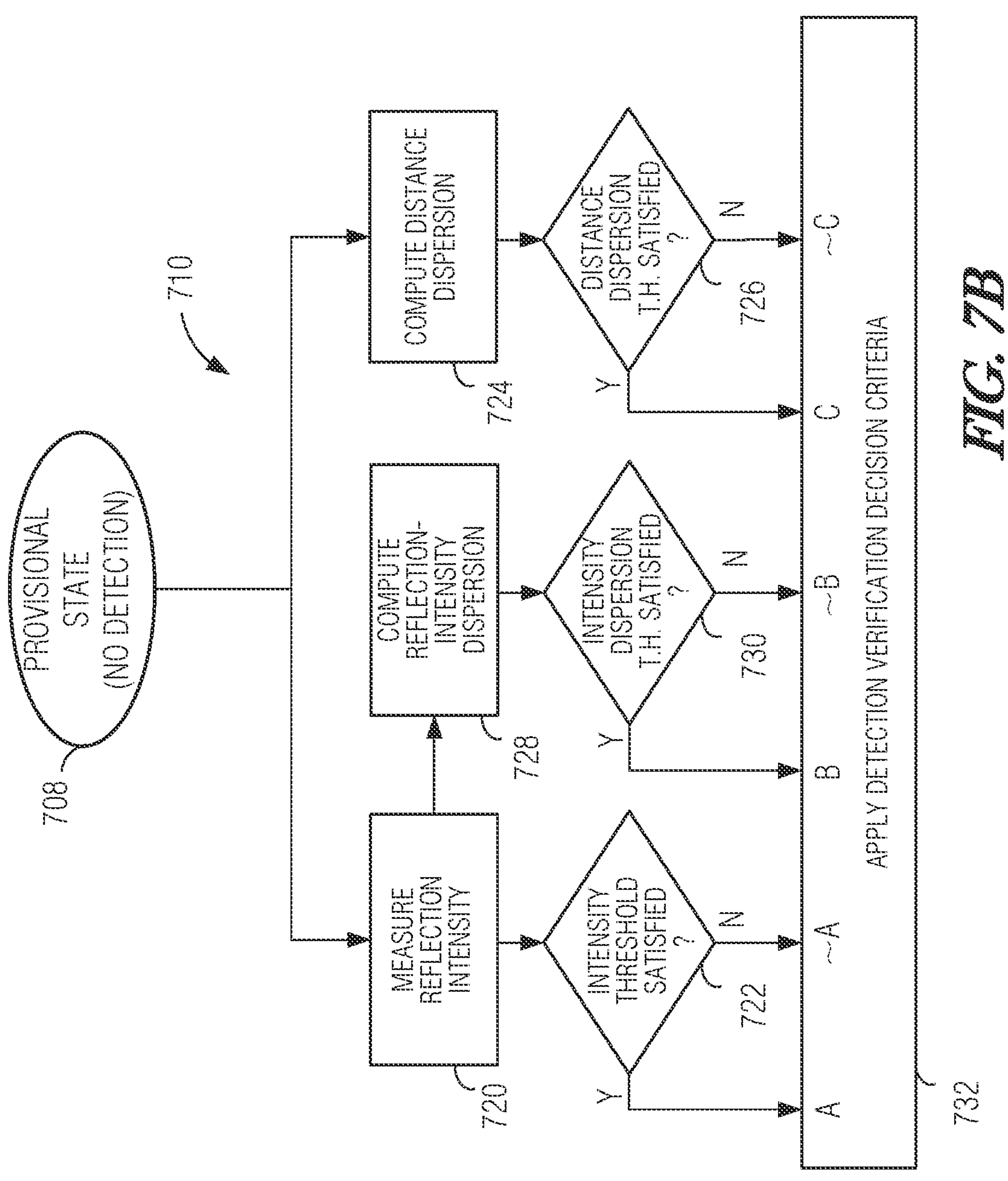

FIG. 7B is a flow diagram illustrating multi-modal verification operation 710, for the OFF-to-ON transition, according to an example implementation. In provisional state 708, measurement is made of reflection intensity at 720 (e.g., using multiple sampling as discussed above with respect to the distance measurement at 704, with the number of samples m of reflection intensity being the same or different from n). The reflection-intensity measurement(s) are compared against the upper and lower reflection-intensity thresholds at 722, with the result(s) of the comparison(s) being indicated as A or ~A for satisfaction of either threshold, non-satisfaction of either threshold, respectively.

In related embodiments, computation is performed at 724 to determine the dispersion of distance measurements collected at 704, and compare the dispersion assessment against the distance-dispersion threshold at 726 to produce indicia C or ~C for satisfaction of the distance-dispersion threshold, and non-satisfaction thereof, respectively. Furthermore, in the example depicted, the reflection-intensity dispersion is computed at 728 based on the reflection-intensity measurements collected at 720. The reflection-intensity dispersion is compared against the corresponding threshold at 730 to produce indicia B or ~B for satisfaction of the reflection-intensity dispersion threshold, and non-satisfaction thereof, respectively.

At 732, detection-verification decision criteria is applied to the results of the reflection-intensity threshold-comparison result and, likewise, to the dispersion threshold-comparison results for distance and reflection intensity, to produce a determination of whether the initial trigger giving rise to provisional state 708 should be confirmed to indicate an object detection. FIG. 8A shows various simple examples of Boolean logic that may be applied as the detection verification decision criteria at 732 according to some embodiments. The detection verification decision criteria may be specifically selected for the application (e.g., taking into consideration the reflectivity, motion, and variability of the background surface and the types of objects to be detected). In related embodiments, more sophisticated decision criteria may be utilized, such as criteria that applies different weighting to the various modalities, with the relative weighting suitably geared to the application. Thus, for example, certain types of objects to be detected are better distinguished from the background surface using reflection intensity rather than distance, whereas other types of objects are better discriminated using one or both dispersion modalities.

Referring again to FIG. 7A, in some related embodiments, as depicted, decision 716 determines whether a condition for tuning, or adjusting, the verification criteria is met and, if such is the case, the verification criteria is tuned at 718. Tuning of the verification criteria may involve selecting or constructing different decision logic to improve the accuracy of detection or, as applicable, adjusting the relative weighting of different ones of the modalities. Accuracy of detection may be improved autonomously or semi-autonomously via a learning program that gathers multi-modal measurement statistics and identifies one or more modes of detection that show a tendency of reliably discriminating the baseline (background surface) measured characteristics in terms of distance, reflection intensity, distance dispersion, or intensity dispersion, from the characteristics of objects to be detected. According to the learning program, modalities which tend to reliably be in agreement with one another to indicate detection may be favored over modalities which tend to not be reliably in agreement. For purposes of training the learning program, ground-truth information (e.g., the actual presence of an object) may be provided by a human operator, or it may be based on a secondary sensor. In a fully-autonomous self-learning implementation, a portion of a detected object which is clearly detected by multiple different modalities (e.g., the center of the object having a closer distance to object detector 110) may be used to tune the verification criteria for detection of uncertain portions of the same object (e.g., the ends of the object, which may have a greater distance) that are detected by some modalities but not others, thus improving the accuracy of verification of detection of those uncertain portions. Notably, the tuning may be performed either in the OFF state or the ON state according to this example.

Figure 7C:
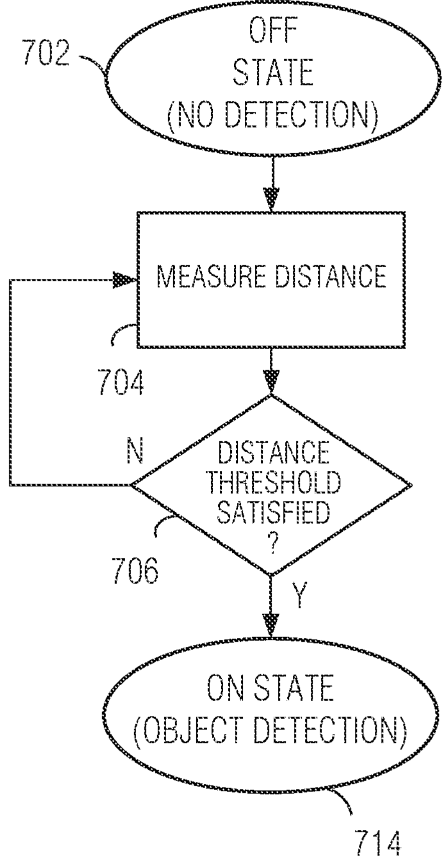

FIG. 7C is a flow diagram illustrating a simplified embodiment in which the object detection is a single-stage process in place of the processes of FIGS. 7A-7B. Operations 702-706 of the embodiment depicted in FIG. 7C are as described above with reference to FIG. 7A, except that in response to satisfaction of the distance threshold at 706, the object is detected and the ON state 714 is asserted.

Figure 7D:
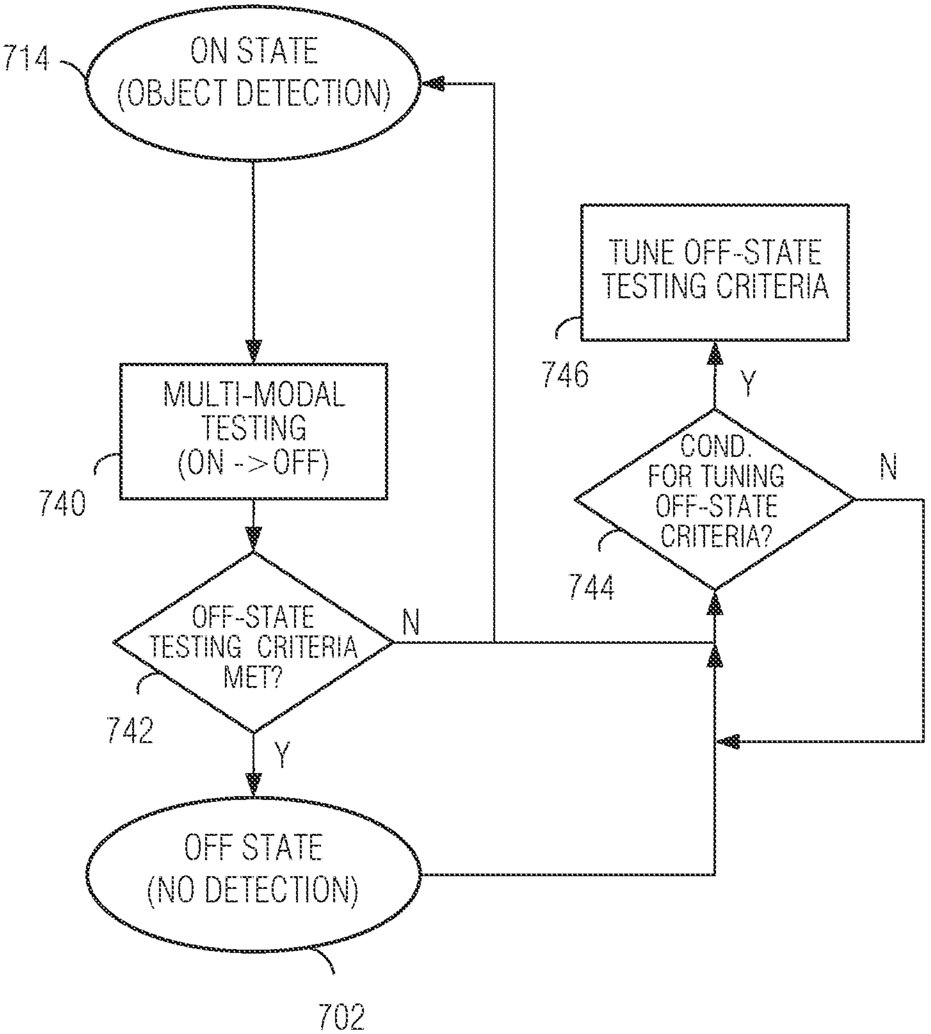

FIG. 7D is a flow diagram illustrating an example multi-modal process for transitioning an object detector from an ON state (indicating detection of an object) to an OFF state (indicating no object detected) according to an example embodiment. The process starts at ON state 714. At 740, multi-modal testing is performed to determine if the object is still present in the target area of the object detector, including application of off-state testing criteria. Decision 742 determines whether the on-to-off-change testing criteria is met. In the affirmative case, the detection state is changed to the OFF state 702 to indicate no object is detected. In the negative case, the process loops back iterate once again while remaining in the ON state at 714.

Figure 7E:
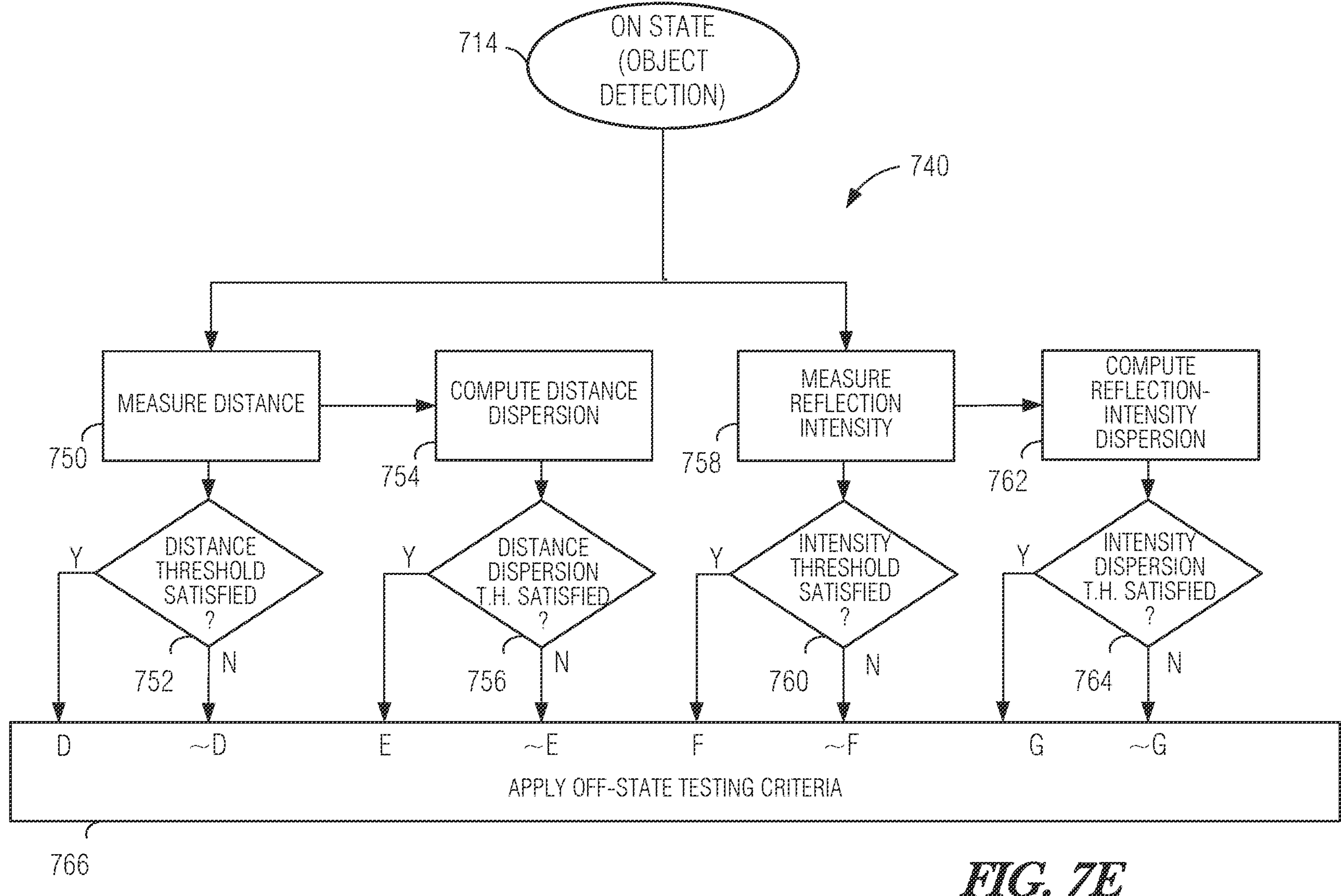

FIG. 7E is a diagram illustrating a multi-modal testing procedure according to an example implementation of operation 740. At 750, distance measurements are collected (e.g., taking n or a different quantity of samples). At 752, the distance measurements are compared against the upper and lower distance thresholds to produce comparison results D and ~D indicating the satisfaction or non-satisfaction of the thresholds, respectively. At 754 the dispersion of the distance measurements, which were collected at 750, is computed. At 756 the distance dispersion is compared against the dispersion threshold to produce comparison results E and ~E respectively indicating satisfaction, and non-satisfaction of the distance-dispersion threshold. At 758, measurement is made of the reflection intensity (e.g., taking m or a different number of samples). At 760, the upper and lower reflection-intensity thresholds are applied to produce comparison results F and ~F indicating satisfaction or non-satisfaction of any of the reflection-intensity thresholds. At 762, reflection-intensity dispersion is computed based on the reflection-intensity measurements made at 758. At 764, the computed reflection-intensity dispersion is compared against the applicable threshold to produce comparison results G and ~G, indicating satisfaction and non-satisfaction of the reflection-intensity threshold, respectively.

At 766, the comparison results D, ~D, E, ~E, F, ~F, G, and ~G are subject to off-state testing criteria. FIG. 8B shows some examples of Boolean logic that may be applied as off-state testing criteria according to various embodiments. The selection of the off-state testing criteria may be specific to the application to optimize accuracy. In related embodiments, more sophisticated off-state testing criteria may be utilized, such as criteria that applies different weighting to the various modalities, with the relative weighting suitably geared to the application and characteristics of the objects and background surface. Application of the off-state testing criteria produces a determination as to whether the state change to the OFF state, corresponding to non-detection of an object, is appropriate for object detector 110.

Referring again to FIG. 7D, the off-state testing criteria may be tuned in a similar manner to the tuning of the verification criteria as described above with reference to FIG. 7A, according to some embodiments. Accordingly, at 744 a decision is made as to whether the conditions for tuning the on-state criteria are met. In a related example, the condition for tuning the on-state criteria may include a duration of the ON state 714 or, equivalently, a traveled distance of the object while object detector 110 is in the ON state 714. In one such implementation, when the duration or distance traveled of the object exceeds a predefined threshold (e.g., corresponding to an expected length dimension of the type of object subject to detection), the off-state testing criteria may be adjusted to be less stringent (e.g., fewer modalities may be required to be in agreement for the ON-to-OFF state transition criteria to be met). If the condition for tuning the on-state criteria is met, tuning of the off-state testing criteria is performed (e.g., selection of Boolean logic, adjustment of weights, etc.) at 746. Notably, the tuning may be performed either in the ON state or the OFF state according to this example.

Figure 9A:
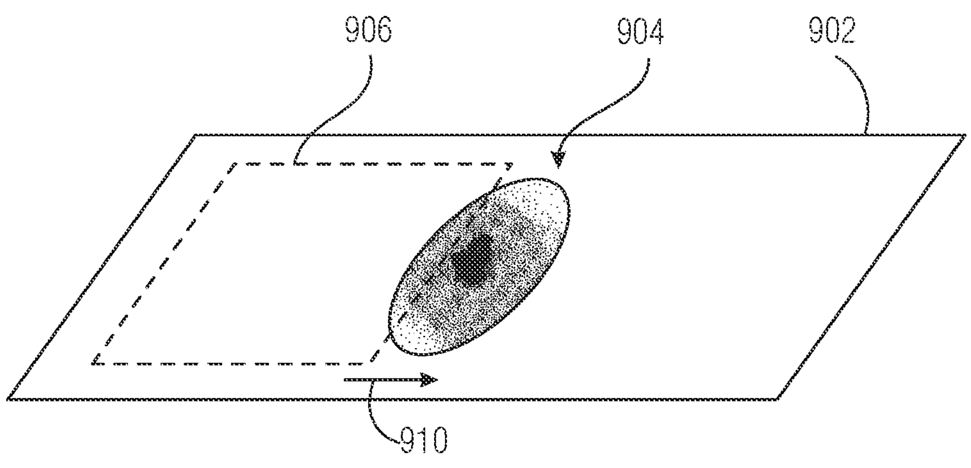
FIGS. 9A-9B are diagrams illustrating examples of characteristics of a background surface and of a surface of an object to be detected, respectively, which depict variations in the surfaces' respective reflection-intensity dispersion.
Figure 9B:
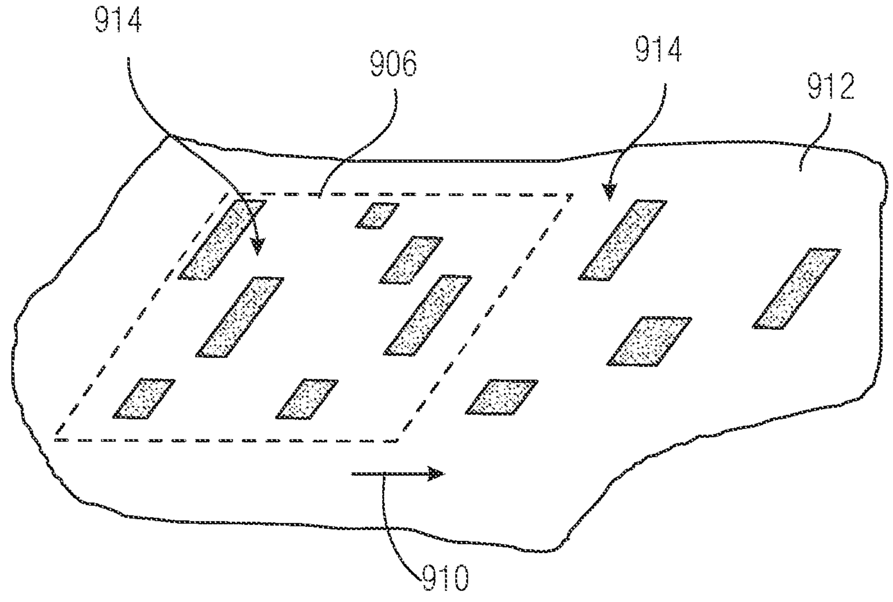

FIGS. 9A-9B are diagrams illustrating examples of characteristics of a background surface and of a surface of an object to be detected, respectively, which depict variations in the surfaces' respective reflection-intensity dispersion. FIG. 9A depicts a portion of background surface 902 (e.g., conveyor belt, platter, or the like) without any detectable objects present. Background surface 902 has spot 904 with a different and uneven reflectance characteristic than other portions of background surface 902. Illumination target area 906 is shown as well. As background surface moves along direction 910, spot 904 is illuminated and causes a different reflection intensity than the other portions of the background surface 902.

FIG. 9B illustrates a portion of a surface of an object 912 to be detected. Object 912 in this example may have a shiny and irregular surface such as the surface described above with reference to object 404 (FIG. 4), with various folds, facets, curves, graphics, and other surface irregularities, collectively indicated at 914, which cause specular reflections or variations in contrast that vary the reflection intensity as the object moves along direction 910 through target area 906.

Figure 10:
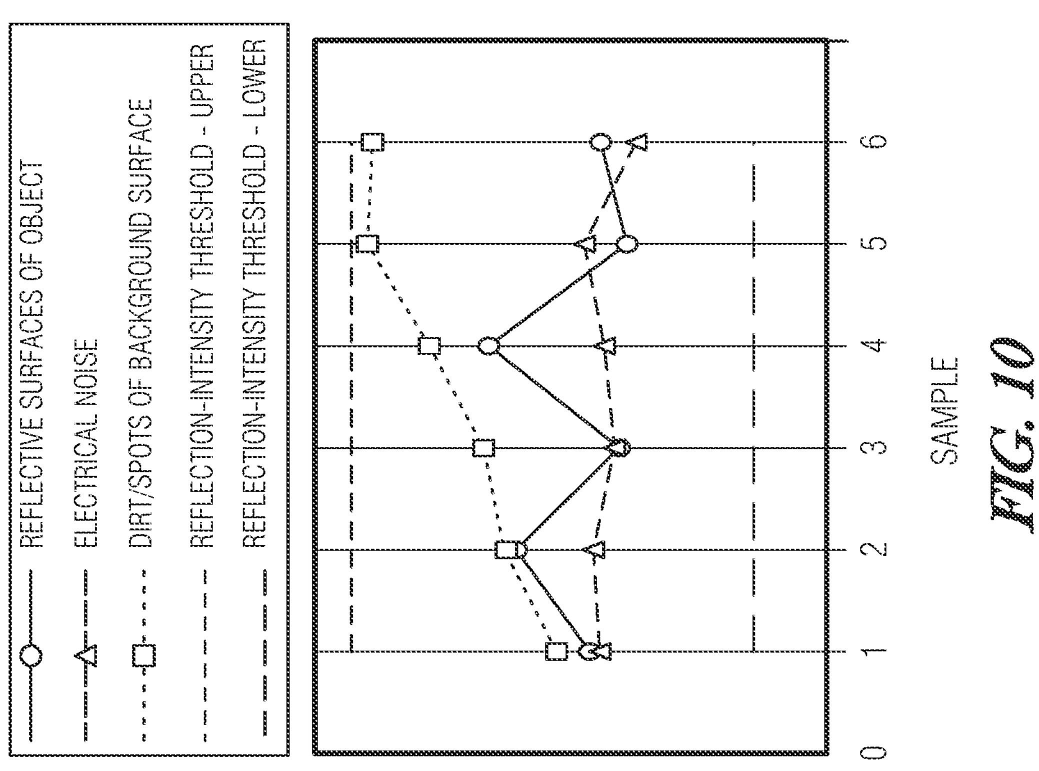
FIG. 10 is a chart illustrating reflection-intensity measurements in a use case in which the background surface is similar to the example of FIG. 9A and the object surface is similar to the example of FIG. 9B.

FIG. 10 is a chart illustrating reflection-intensity measurements in a use case in which the background surface is similar to the example of FIG. 9A and the object surface is similar to the example of FIG. 9B. As shown in the chart of FIG. 10, the reflection intensity is measured as a series of six samples. The upper and lower reflection-intensity thresholds are depicted using dashed lines. In this example, the dirt or spots of the background surface produces reflection intensity which is between the upper and lower thresholds, but is greater than the reflection intensity of the reflective surfaces of the object, which is close to the noise floor of the system. In this example, the reflection intensity, on its own, is not a suitable modality for distinguishing the surface of the object from the background surface.

However, examining the patterns of the dispersion of the reflection intensity between the surface of the object and the background reveals differences that are sufficient to discriminate the two. As shown, the background reflection intensity tends to rise gradually from one sample to the next, peaking at sample 5, and then falling slightly at sample 6. The dispersion from one sample to the next tends to be small and generally unidirectional. In contrast, the dispersion pattern of the object's shiny and irregular surface varies widely, and in changing directions from one sample to the next.

Figure 11:
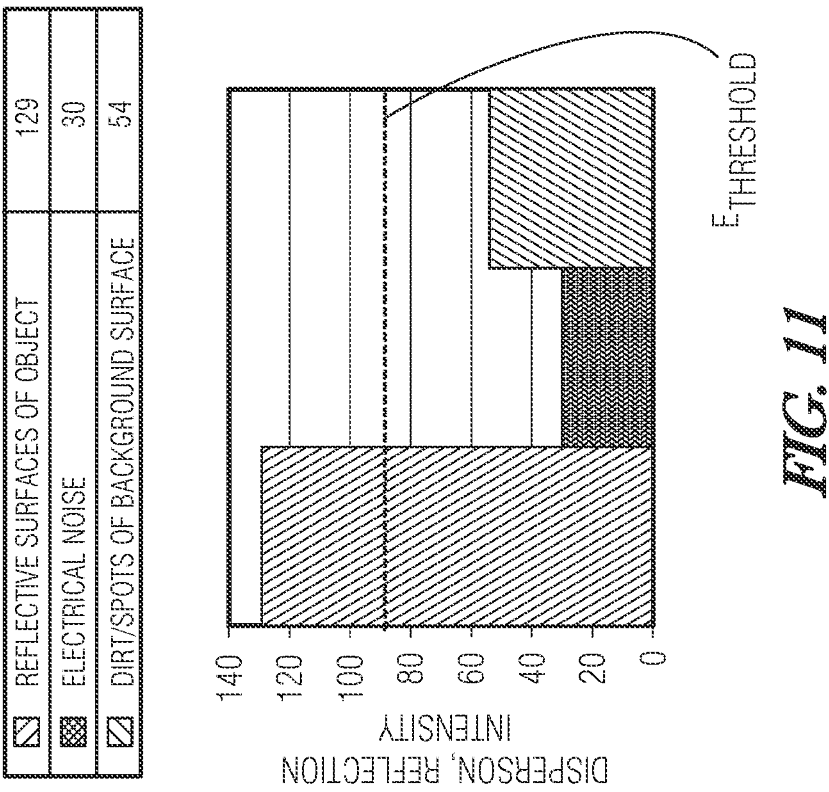
FIG. 11 is a chart illustrating a comparison of relative levels of the computed reflection-intensity dispersion of the reflective surfaces of the object, electrical noise, and dirt/spots and non-uniformity of the background surface in the use-case example of FIGS. 9A-9B and 10.

FIG. 11 is a chart illustrating a comparison of relative levels of the computed reflection-intensity dispersion of the reflective surfaces of the object, electrical noise, and dirt/spots and non-uniformity of the background surface. In this example, the dispersion patterns are quantified in as sums of differences in reflection-intensity energy. As shown, the extent of dispersion of the reflection intensity of the object's surface is substantially greater than that of the background. Accordingly, for this type of object, the reflection-intensity dispersion may be a more suitable modality with which to discriminate the object from the background surface utilizing object detector 110. A threshold energy value, $E_{THRESHOLD}$, is set at a level that is greater than the reflection-intensity dispersion corresponding to the background surface and noise floor, and the reflection-intensity dispersion corresponding to the object's reflective surfaces.

Figure 12:
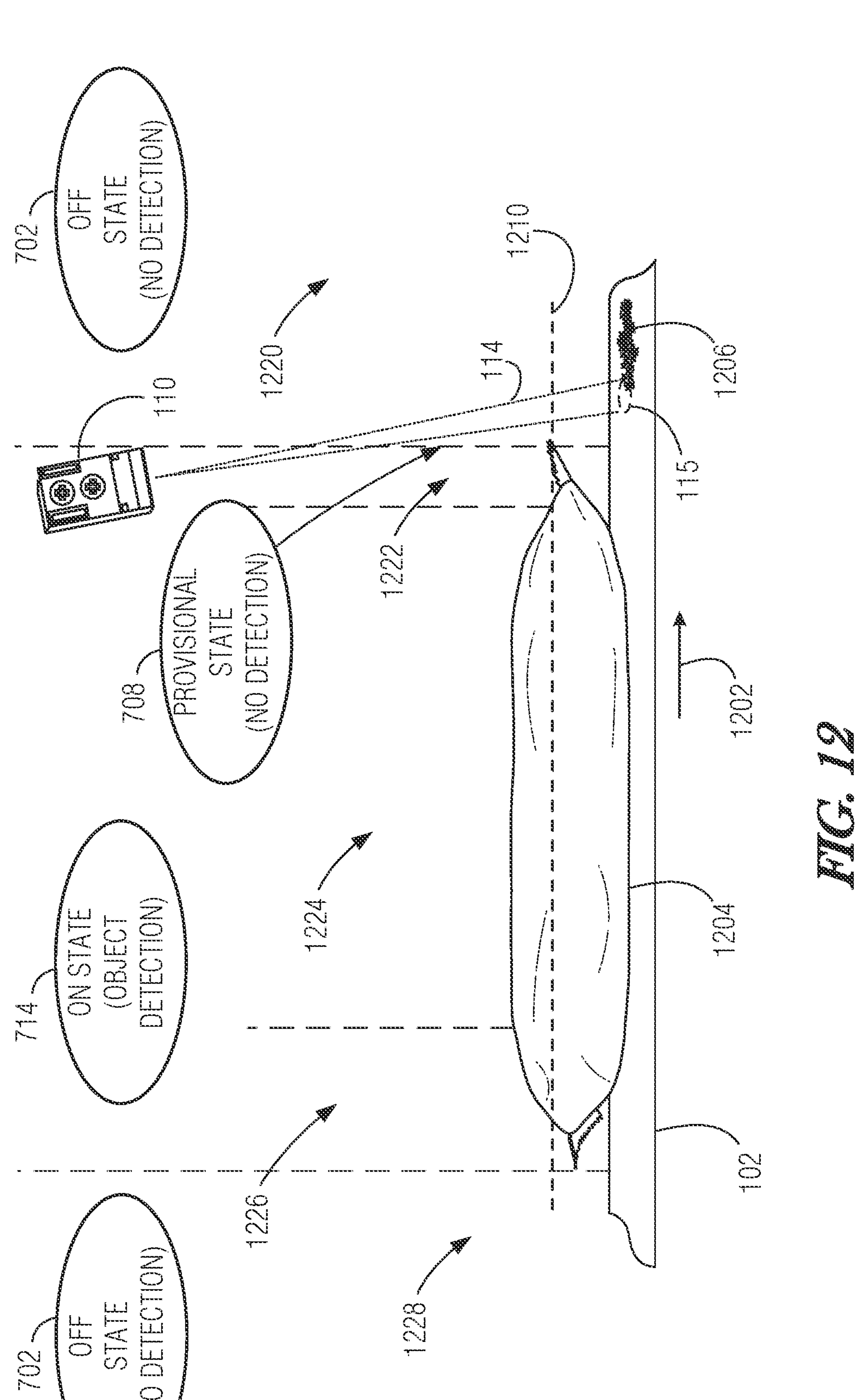
FIG. 12 is a diagram illustrating application of a multi-modal object detection technique according to some embodiments to a particular use case as an example.

FIG. 12 is a diagram illustrating a particular use case in which a multi-modal object detection technique according to some embodiments is applied. In this example, object detector 110 is arranged to detect object 1204 that is moved by conveyor 102 along direction of travel 1202 (as shown, from left to right on the page). Transmitted light 114 from an illumination source is directed to target area 115 through which object 1204 may pass. A triangulation arrangement such as optical system 200 with a BGS sensor (FIG. 2) may be employed in object detector 110 to measure distance to the surface of conveyor belt 102 or surfaces of object 1204. Likewise, the photosensor of object detector 110 is able to measure the intensity of reflected light, and compute dispersion of distance measurements and dispersion of reflection-intensity measurements in accordance with one or more of the embodiments described above.

In this illustrative example, various challenges are presented to object detector 110. For instance, the surface of conveyor belt 102 may have a non-uniformities, such as marks, abrasions, stains, spills, etc., represented as dirty spot 1206, which can cause variable reflectance of light. Furthermore, object 1204 in this example is a pouch made from plastic film, which may be shiny, irregular, winkled, folded, faceted, transparent, have various graphics, colors, or shades, or some combination of such characteristics, which can cause specular reflections, or an absence of reflection at certain surface angles. Moreover, the general shape of the pouch has different heights, particularly at the ends. In the face of these challenges, it is desirable to obtain an accurate and reliable detection of object 1204 as it passes through target area 115, with the ON and OFF state transitions correctly corresponding to the end boundaries of object 1204.

As object 1204 advances along direction of travel 1202, different detection modalities are employed, and at various moments, certain modalities are better suited than others to indicate an accurate detection/non-detection state. The spaces ahead of, occupied by, and behind, object 1204, are indicated as regions 1220-1228, with each region passing through target area 115 in sequence. At region 1220, before object 1204 approaches target area 115, object detector 702 indicates OFF state 702. As described above with reference to FIG. 7A, in this state, object detector 110 primarily monitors the distance measurement (via triangulation) for a trigger event. At this stage, object detector 110 measures the distance to conveyor belt 102. Distance measurement is a preferred modality at this stage because the reflectance of the conveyor belt surface is more variable than the distance measurement, particularly because surface irregularities tend to be planar, and a BGS sensor arrangement of object detector 110 has high immunity from specular reflections from a surface that is not perpendicular to the transmitted light 114.

A trigger event is caused by a leading portion of object 1204 exceeding the lower distance threshold 1210, thus advancing the state of object detector 110 to provisional state 708 at the start of region 1222. In region 1222, one or more additional modalities of measurement are performed to confirm the detection of an object, and to continue monitoring the ON state. As depicted, the leading portion of object 1204 may have varying height, depending on the folds and seam orientation of the plastic pouch of object 1204. Hence, distance measurement, alone, may be inconsistent as it may extend beyond lower distance threshold 1210. The reflection-intensity measurement or dispersion computation of the distance measurement or of the reflection intensity, whether individually or in combination, are more reliable indicators of the presence of object 1204. Accordingly, reflection intensity, dispersion, or a combination thereof, is primarily relied upon to verify and monitor the presence of object 1204. From provisional state 708, verification of object detection advances the state of object detector 110 to ON state 714 in region 1222, notwithstanding any instability of the distance measurement. Thus, the distance measurement which was used to detect the trigger event, may be disregarded or given a lesser weighting for purposes of verifying and monitoring the ON state following the trigger event.

In an alternative and simpler embodiment, consistent with the example described above with reference to FIG. 7C, the trigger event caused by a leading portion of object 1204 exceeding the lower distance threshold 1210, is sufficient to advance the state of object detector 110 to ON state 714.

In region 1224, the height of object 1204 is consistently nearer object detector 110 than the distance corresponding to lower distance threshold 1210. Here, the distance measurement is reliable while it is stable. Accordingly, in one implementation, while in the ON state 714, the distance measurement is relied upon as long as the dispersion of distance measurements is below a set threshold. Independently, the reflection-intensity measurement, and dispersion of the reflection-intensity measurements, may also be monitored in region 1224, with a high dispersion of reflection-intensity measurements being indicative of the presence of object 1204, similar to the example described above with reference to FIGS. 9A-9B and 10-11.

In region 1226, the tail end of object 1204 tends to slope downward, which may cause specular reflections from the surface of object 1204 to strike the photosensor of object detector 110, which may cause the reflection-intensity measurements to be unstable and fluctuate between exceeding and not exceeding one or both reflection-intensity thresholds Likewise, since the end of object slopes downward, the distance measurement may also be uncertain. Therefore, in region 1226, the reflection-intensity dispersion may be used as a primary measure for assessing the presence of object 1204. The distance-measurement dispersion measurement may also be relied upon, particularly if the distance-measurement dispersion associated with the surface of object 1204 is well discriminated from the distance-measurement dispersion associated with the surface of conveyor 102. In this manner, the tail end of object 1204 may be accurately monitored while maintaining ON state 714, until the multimodal detection recognizes the surface of conveyor 102, at which point the state of detection may transition to OFF state 702. Region 1228 represents the space behind object 1204, where the distance measurement is expected to be generally reliable and stable while monitoring the surface of conveyor 102.

In the example use case described above with reference to FIG. 12, object detector 110 autonomously varies the modalities (or the relative weighting applied to the modalities) of monitoring the presence of object 1204. The criteria for varying the modality of detection may be based on a priori knowledge of the general size and shape of object 1204, along with the patterns of measurement in the various modalities. For instance, measurement-dispersion patterns are indicative of the known regions. This type of criteria may exemplify the condition for tuning the verification criteria at decision 716 (FIG. 7A) or the condition for tuning the on-state criteria at 744 (FIG. 7D). Additionally or alternatively, timing measurements (taking into account the speed or movement pattern of conveyor 102) relative to the initiation of object detection may be used to determine or approximate the region.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalents.

ADDITIONAL NOTES AND EXAMPLES

Example 1 is apparatus of a photosensing object detector, the apparatus comprising: controller circuitry interfaced with an illumination source and a photosensor of the object detector, the controller circuitry operative to: read distance measurement information as measured by the photosensor, the distance measurement information corresponding to a target area monitored by the photosensor; and computationally determine any presence of at least a portion of an object within the target area between the object detector and a background surface, wherein determination of the presence is based on the distance measurement information; wherein the distance measurement information is compared against a lower distance threshold and an upper distance threshold, the lower distance threshold representing a distance between the object detector and the background surface, less a subtracted margin; and the upper distance threshold representing a distance between the object detector and a point beyond a distance of the background surface by an added margin, and wherein satisfaction of the lower distance threshold is indicative of the presence of at least a portion of the object within the target area, and satisfaction of the upper distance threshold is indicative of the presence of at least a portion of the object within the target area.

In Example 2, the subject matter of Example 1 includes, wherein the distance measurement information is based on a triangulation-based measurement in which light from the illumination source is reflected from a surface at the target area monitored by the photosensor and received at a portion of the photosensor, wherein that portion of the photosensor varies based on the distance between the object detector and the surface.

In Example 3, the subject matter of Examples 1-2 includes, wherein the controller circuitry is further operative to compute a measure of dispersion of the distance measurement information, the dispersion of the distance measurement information representing variability of a set of distance measurements of the distance measurement information; and wherein the controller circuitry is further operative to determine the presence of at least a portion of the object within the target area based on the measure of dispersion of the distance measurement information.

In Example 4, the subject matter of Example 3 includes, wherein the measure of dispersion of the distance measurement information is compared against a distance-dispersion threshold representing a defined degree of variability of the set of distance measurements which is different, by a given margin, from a baseline degree of variability of a set of distance measurements corresponding to the background surface, and wherein satisfaction of the distance-dispersion threshold is indicative of the presence of at least a portion of the object within the target area.

In Example 5, the subject matter of Examples 1-4 includes, wherein the controller circuitry is further operative to read reflection-intensity measurement information as measured by the photosensor; and wherein the controller circuitry is further operative to determine the presence of at least a portion of the object within the target area based on the reflection-intensity measurement information.

In Example 6, the subject matter of Example 5 includes, wherein the controller circuitry is further operative to compute a measure of dispersion of the reflection-intensity measurement information, the dispersion of the reflection-intensity measurement information representing variability of a set of reflection-intensity measurements of the reflection-intensity measurement information; and wherein the controller circuitry is further operative to determine the presence of at least a portion of the object within the target area based on the measure of dispersion of the reflection-intensity measurement information.

In Example 7, the subject matter of Example 6 includes, wherein the measure of dispersion of the reflection-intensity measurement information is compared against a reflection-intensity measurement dispersion threshold representing a defined degree of variability of the set of reflection-intensity measurements which is different, by a given margin, from a baseline degree of variability of a set of reflection-intensity measurements corresponding to the background surface, and wherein satisfaction of the reflection-intensity measurement threshold is indicative of the presence of at least a portion of the object within the target area.

In Example 8, the subject matter of Examples 5-7 includes, wherein the reflection-intensity measurement information is compared against a lower reflection-intensity threshold and an upper reflection-intensity threshold, the lower reflection-intensity threshold representing a reflection intensity that is less than a baseline reflection intensity of the background surface by a first defined margin, and the upper reflection-intensity threshold representing a reflection intensity that is greater than a baseline reflection intensity of the background surface by a second defined margin; and wherein satisfaction of the lower reflection-intensity threshold is indicative of the presence of at least a portion of the object within the target area, and satisfaction of the upper reflection-intensity threshold is indicative of the presence of at least a portion of the object within the target area.

Example 9 is a method for autonomously operating a photosensing object detector that includes, an illumination source and a photo sensor, the method comprising: performing a baseline characterization of a background surface, the background characterization including: measuring of distance between the object detector and the background surface; measuring a characteristic of the background surface using a modality that is different from the distance; and performing an initial detection of any presence of at least a portion of an object within a target area between the object detector and a background surface, the initial detection being based at least in part on a distance measurement of a first difference between the object detector and any surface within the target area; performing multi-modal testing of any presence of at least a portion of an object within the target area, the multi-modal testing including: performing a verification of continued presence at least a portion of the object within the target area, including applying off-state testing criteria that includes a measure of a second difference between any surface within the target area and the background surface, the measure of the second difference being in a measurement modality that different from the distance measurement.

In Example 10, the subject matter of Example 9 includes, wherein in performing the baseline characterization, the characteristic of the background surface includes reflection intensity of the background surface.

In Example 11, the subject matter of Example 10 includes, wherein performing the multi-modal testing includes: measuring reflection intensity of light reflected off of any surface within the target area to produce a reflection-intensity measurement; and applying the off-state testing criteria includes determining the measure of the second difference as a difference between the reflection-intensity measurement and the reflection intensity of the background surface measured in the baseline characterization, wherein the second difference is indicative of the presence of at least a portion of the object within the target area.

In Example 12, the subject matter of Examples 10-11 includes, wherein: performing the baseline characterization further includes: setting at least one distance threshold representing a reference distance that is different from the distance between the object detector and the background surface by a defined distance margin; and setting a reflection-intensity threshold representing a reference reflection intensity that is different from the reflection intensity of the background surface by a defined intensity margin; determining the first difference includes applying the at least one distance threshold to the distance measurement, wherein satisfaction of at least one of the at least one distance threshold is indicative of a trigger event for verification of the presence of at least a portion of the object within the target area; and applying the off-state testing criteria includes determining the measure of the second difference by applying the reflection-intensity threshold to the reflection-intensity measurement, wherein satisfaction of the reflection-intensity threshold is indicative of the presence of at least a portion of the object within the target area.

In Example 13, the subject matter of Example 12 includes, wherein the at least one distance threshold includes a lower distance threshold and an upper distance threshold, the lower distance threshold representing a distance between the object detector and the background surface, less a subtracted margin; and the upper distance threshold representing a distance between the object detector and a point beyond a distance of the background surface by an added margin, and wherein satisfaction of either the lower distance threshold or the upper distance threshold is indicative of the presence of at least a portion of the object within the target area.

In Example 14, the subject matter of Examples 9-13 includes, wherein measuring the distance in the baseline characterization and in the multi-modal testing includes performing triangulation-based measurement in which light from the illumination source is reflected from a present surface at the target area and received at a portion of the photosensor, wherein that portion of the photosensor varies based on the distance between the object detector and the present surface.

In Example 15, the subject matter of Examples 9-14 includes, wherein: the baseline characterization further includes computing a measure of dispersion of a set of distance measurements between the object detector and the background surface, including the distance measurement between the object detector and the background surface, the dispersion of the set of distance measurements representing variability within the set of distance measurements; and wherein applying the off-state testing criteria includes determining the measure of the second difference as determining the presence of at least a portion of the object within the target area based on the measure of dispersion of the set of distance measurements.

In Example 16, the subject matter of Examples 9-15 includes, wherein: the baseline characterization further includes computing a measure of dispersion of a set of reflection-intensity measurements of the background surface, including the reflection-intensity measurement of the background surface, the dispersion of the set of reflection-intensity measurements representing variability within the set of reflection-intensity measurements; and wherein applying the off-state testing criteria includes determining the measure of the second difference as determining the presence of at least a portion of the object within the target area based on the measure of dispersion of the set of reflection-intensity measurements.

In Example 17, the subject matter of Examples 9-16 includes, wherein applying the off-state testing criteria includes determining a plurality of different measures of differences between any surface within the target area and the background surface, the plurality of measures of differences including a plurality of different modalities that are each different from the distance measurement.

In Example 18, the subject matter of Example 17 includes, wherein the multi-modal testing further includes: determining whether a defined condition for adjusting the off-state testing criteria is met and, in response to meeting of the defined condition, selecting a combination of measures of differences from among a greater plurality of available measures of differences as the off-state testing criteria.

In Example 19, the subject matter of Examples 9-18 includes, wherein the multi-modal testing further includes: determining whether a defined condition for adjusting the off-state testing criteria is met and, in response to meeting of the defined condition, adjusting the off-state testing criteria.

Example 20 is at least one machine-readable medium including instructions that, when executed by processing circuitry, cause the processing circuitry to perform operations to implement of any of Examples 9-19.

Example 21 is an apparatus comprising means to implement of any of Examples 9-19.

Example 22 is a system to implement of any of Examples 9-19.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of 35 U.S.C. § 112(f), are not to be invoked unless the specific terms "means for" or "step for" are recited in a claim.

What is claimed is:

1. Apparatus of a photosensing object detector, the apparatus comprising:

controller circuitry interfaced with an illumination source and a photosensor of the object detector, the controller circuitry operative to:

read distance measurement information as measured by the photosensor, the distance measurement information corresponding to a target area monitored by the photosensor; and computationally determine any presence of at least a portion of an object within the target area between the object detector and a background surface, wherein determination of the presence is based on the distance measurement information, and wherein the distance measurement information is compared against a lower distance threshold and an upper distance threshold, the lower distance threshold representing a distance between the object detector and the background surface by a subtracted margin; and the upper distance threshold representing a distance between the object detector and a point beyond a distance of the background surface by an added margin, and wherein satisfaction of the lower distance threshold is indicative of the presence of at least a portion of the object within the target area, and satisfaction of the upper distance threshold is indicative of the presence of at least a portion of the object within the target area;

read reflection-intensity measurement information as measured by the photosensor, and determine the presence of at least a portion of the object within the target area based on the reflection-intensity measurement information;

compute a measure of dispersion of the reflection-intensity measurement information, the dispersion of the reflection-intensity measurement information representing variability of a set of reflection-intensity measurements of the reflection-intensity measurement information, wherein the measure of dispersion of the reflection-intensity measurement information is compared against a reflection-intensity measurement dispersion threshold representing a defined degree of variability of the set of reflection-intensity measurements which is different, by a given margin, from a baseline degree of variability of a set of reflection-intensity measurements corresponding to the background surface, and wherein satisfaction of the reflection-intensity measurement threshold is indicative of the presence of at least a portion of the object within the target area; and determine the presence of at least a portion of the object within the target area based on the measure of dispersion of the reflection-intensity measurement information.

2. The apparatus of claim 1, wherein the distance measurement information is based on a triangulation-based measurement in which light from the illumination source is reflected from a surface at the target area monitored by the photosensor and received at a portion of the photosensor, wherein that portion of the photosensor varies based on the distance between the object detector and the surface.

3. The apparatus of claim 1, wherein the controller circuitry is further operative to compute a measure of dispersion of the distance measurement information, the dispersion of the distance measurement information representing variability of a set of distance measurements of the distance measurement information; and wherein the controller circuitry is further operative to determine the presence of at least a portion of the object within the target area based on the measure of dispersion of the distance measurement information.

4. The apparatus of claim 3, wherein the measure of dispersion of the distance measurement information is compared against a distance-dispersion threshold representing a defined degree of variability of the set of distance measurements which is different, by a given margin, from a baseline degree of variability of a set of distance measurements corresponding to the background surface, and wherein satisfaction of the distance-dispersion threshold is indicative of the presence of at least a portion of the object within the target area.

5. The apparatus of claim 1, wherein the reflection-intensity measurement information is compared against a lower reflection-intensity threshold and an upper reflection-intensity threshold, the lower reflection-intensity threshold representing a reflection intensity that is less than a baseline reflection intensity of the background surface by a first defined margin, and the upper reflection-intensity threshold representing a reflection intensity that is greater than the baseline reflection intensity of the background surface by a second defined margin; and wherein satisfaction of the lower reflection-intensity threshold is indicative of the presence of at least a portion of the object within the target area, and satisfaction of the upper reflection-intensity threshold is indicative of the presence of at least a portion of the object within the target area.

6. A method for autonomously operating a photosensing object detector that includes an illumination source and a photosensor, the method comprising:

performing a baseline characterization of a background surface, the background characterization including:

measuring of distance between the object detector and the background surface;

measuring a characteristic of the background surface using a modality that is different from the distance;

performing an initial detection of any presence of at least a portion of an object within a target area between the object detector and a background surface, the initial detection being based at least in part on a distance measurement of a first difference between the object detector and any surface within the target area; and performing multi-modal testing of any presence of at least a portion of an object within the target area, the multi-modal testing including:

performing a verification of continued presence at least a portion of the object within the target area, including applying off-state testing criteria that includes a measure of a second difference between any surface within the target area and the background surface, the measure of the second difference being in a measurement modality that is different from the distance measurement, wherein the baseline characterization further includes computing a measure of dispersion of a set of reflection-intensity measurements of the background surface, including the reflection-intensity measurement of the background surface, the dispersion of the set of reflection-intensity measurements representing variability within the set of reflection-intensity measurements, wherein the measure of dispersion of the reflection-intensity measurement information is compared against a reflection-intensity measurement dispersion threshold representing a defined degree of variability of the set of reflection-intensity measurements which is different, by a given margin, from a baseline degree of variability of a set of reflection-intensity measurements corresponding to the background surface, and wherein satisfaction of the reflection-intensity measurement threshold is indicative of the presence of at least a portion of the object within the target area; and wherein applying the off-state testing criteria includes determining the measure of the second difference as determining the presence of at least a portion of the object within the target area based on the measure of dispersion of the set of reflection-intensity measurements.

7. The method of claim 6, wherein in performing the baseline characterization, the characteristic of the background surface includes reflection intensity of the background surface.

8. The method of claim 7, wherein performing the multi-modal testing includes:

measuring reflection intensity of light reflected off of any surface within the target area to produce a reflection-intensity measurement; and applying the off-state testing criteria includes determining the measure of the second difference as a difference between the reflection-intensity measurement and the reflection intensity of the background surface measured in the baseline characterization, wherein the second difference is indicative of the presence of at least a portion of the object within the target area.

9. The method of claim 7, wherein:

performing the baseline characterization further includes:

setting at least one distance threshold representing a reference distance that is different from the distance between the object detector and the background surface by a defined distance margin; and setting a reflection-intensity threshold representing a reference reflection intensity that is different from the reflection intensity of the background surface by a defined intensity margin;

determining the initial detection includes applying the at least one distance threshold to the measurement of the first distance, wherein satisfaction of at least one of the at least one distance threshold is indicative of the presence of at least a portion of the object within the target area; and applying the off-state testing criteria includes determining the measure of the second difference by applying the reflection-intensity threshold to the reflection-intensity measurement, wherein satisfaction of the reflection-intensity threshold is indicative of the presence of at least a portion of the object within the target area.

10. The method of claim 9, wherein the at least one distance threshold includes a lower distance threshold and an upper distance threshold, the lower distance threshold representing a distance between the object detector and the background surface by a subtracted margin; and the upper distance threshold representing a distance between the object detector and a point beyond a distance of the background surface by an added margin, and wherein satisfaction of either the lower distance threshold or the upper distance threshold is indicative of the presence of at least a portion of the object within the target area.

11. The method of claim 6, wherein measuring the distance in the baseline characterization and in the multi-modal testing includes performing triangulation-based measurement in which light from the illumination source is reflected from a present surface at the target area and received at a portion of the photosensor, wherein that portion of the photosensor varies based on the distance between the object detector and the present surface.

12. The method of claim 6, wherein:

the baseline characterization further includes computing a measure of dispersion of a set of distance measurements between the object detector and the background surface, including the distance measurement between the object detector and the background surface, the dispersion of the set of distance measurements representing variability within the set of distance measurements; and wherein applying the off-state testing criteria includes determining the measure of the second difference as determining the presence of at least a portion of the object within the target area based on the measure of dispersion of the set of distance measurements.

13. The method of claim 6, wherein applying the off-state testing criteria includes determining a plurality of different measures of differences between any surface within the target area and the background surface, the plurality of measures of differences including a plurality of different modalities that are each different from the distance measurement.

14. The method of claim 13, wherein the multi-modal testing further includes:

determining whether a defined condition for adjusting the off-state testing criteria is met and, in response to meeting of the defined condition, selecting a combination of measures of differences from among a greater plurality of available measures of differences as the off-state testing criteria.

15. The method of claim 6, wherein the multi-modal testing further includes:

determining whether a defined condition for adjusting the off-state testing criteria is met and, in response to meeting of the defined condition, adjusting the off-state testing criteria.

16. A system for autonomously operating a photosensing object detector that includes an illumination source and a photosensor, the system comprising:

means for performing a baseline characterization of a background surface including:

means for measuring a distance between the object detector and the background surface;

means for measuring a characteristic of the background surface using a modality that is different from the distance; and means for performing a multi-modal detection of any presence of at least a portion of an object within a target area between the object detector and a background surface, including:

means for measuring distance between the object detector and any surface within the target area to produce a distance measurement;

means for determining a first difference between the distance measurement and the distance between the object detector and the background surface as measured in the baseline characterization, wherein the first difference is indicative of a trigger event for verification of the presence of at least a portion of the object within the target area; and means for performing the verification of at least a portion of the object within the target area in response to the trigger event, including means for applying detection verification decision criteria that includes a measure of a second difference between any surface within the target area and the background surface, the measure of the second difference being in a measurement modality that is different from the distance measurement including at least:

a measure of dispersion of a set of reflection-intensity measurements of the background surface, including the reflection-intensity measurement of the background surface, the dispersion of the set of reflection-intensity measurements representing variability within the set of reflection-intensity measurements, wherein the measure of dispersion of the reflection-intensity measurement information is compared against a reflection-intensity measurement dispersion threshold representing a defined degree of variability of the set of reflection-intensity measurements which is different, by a given margin, from a baseline degree of variability of a set of reflection-intensity measurements corresponding to the background surface, and wherein satisfaction of the reflection-intensity measurement threshold is indicative of the presence of at least a portion of the object within the target area.

17. The method of claim 6, wherein the off-state testing criteria is applied as Boolean logic.

18. The method of claim 6, wherein different modalities of the multi-modal testing have different weighting applied thereto.

19. The method of claim 15, wherein adjusting the off-state testing criteria includes selecting different decision logic.

20. The method of claim 15, wherein adjusting the off-state testing criteria includes adjusting relative weighting of different modalities of the multi-modal testing.

* * * * *